June 28, 1949.  E. A. BINNEY  2,474,647

SPEED CONTROL OF DYNAMOELECTRIC MACHINES

Filed Jan. 29, 1948  2 Sheets-Sheet 1

WITNESSES:
E. A. M'Closkey
Nw. L. Groome

INVENTOR
Eric Alton Binney.
BY C. M. Avery
ATTORNEY

June 28, 1949. E. A. BINNEY 2,474,647
SPEED CONTROL OF DYNAMOELECTRIC MACHINES
Filed Jan. 29, 1948 2 Sheets-Sheet 2
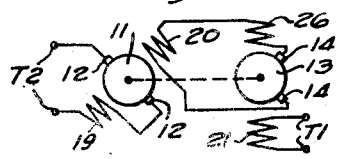
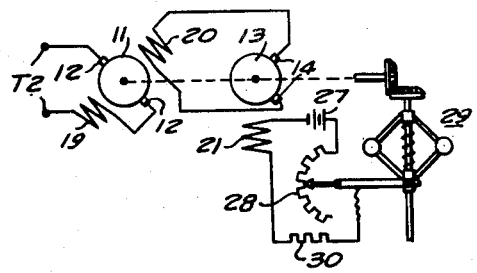
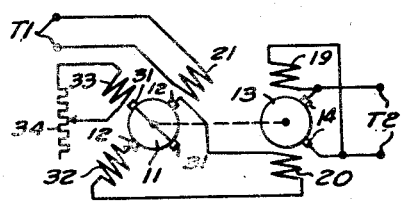
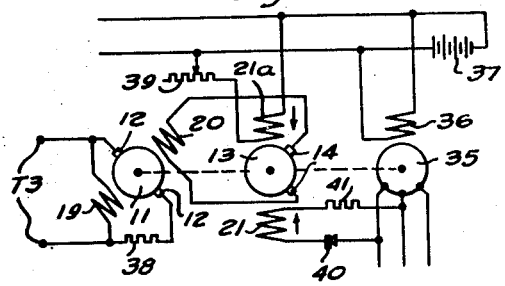
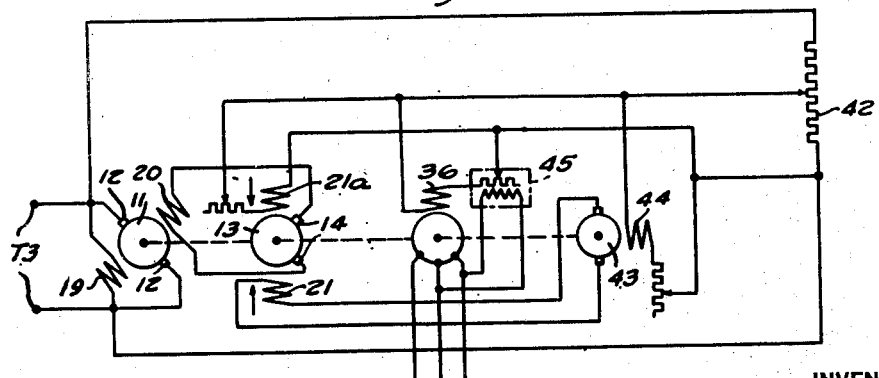
WITNESSES:
E. G. McCloskey
Wm. L. Groome
INVENTOR
Eric Alton Binney.
BY C. M. Avey
ATTORNEY Patented June 28, 1949

2,474,647

UNITED STATES PATENT OFFICE 2,474,647

SPEED CONTROL OF DYNAMOELECTRIC MACHINES

Eric Alton Binney, Ilkley, England, assignor to The English Electric Company Limited, London, England, a British company Application January 29, 1948, Serial No. 5,089
In Great Britain January 12, 1945

Section 1, Public Law 690, August 8, 1946
Patent expires January 12, 1965

15 Claims. (Cl. 318—328)

This invention relates to direct-current dynamos and is related to the invention of my copending application Serial No. 579,584, filed February 24, 1945, for Dynamoelectric machines, the present application presenting, in part, divisional subject matter from the application Serial No. 579,584.

It is an object of the present invention to provide dynamo-electric machines, such as motors, dynamoters, or motor-generator sets, that readily afford an accurate and reliable control or regulation of their running speed regardless of voltage fluctuations in power supply. It is also an object of my invention to design such machines so that they maintain their speed at a substantially constant value despite the occurrence of such fluctuations. Another more specific object of the invention is to incorporate at least part of the speed controlling or regulating means in the electromagnetic design proper of the dynamo so that a strong convective forcing action is automatically effective in the dynamo fields if the speed tends to depart from the desired value.

In order to attain these objects and in accordance with one feature of my invention, I provide an electric direct-current motor with an armature winding, a speed controlling field winding and means incorporated in the motor for producing a magnetic flux, linked with said armature winding, which is an amplification of the flux produced by said speed controlling field winding.

According to another feature of my invention, the motor has an armature which is common to a 2-pole and a 4-pole field system, one field system carrying a self-excited field winding and the other a separately excited winding, the armature carrying both a 2-pole winding and a 4-pole winding connected to separate commutators.

According to another, more specific feature a motor of the just mentioned kind is designed and operated so that the power supply is to the 2-pole armature winding through a 2-pole series field winding, while the main 2-pole field winding is energized by the 4-pole armature winding and the 4-pole field winding serves as the speed controlling winding supplied with a small amount of energy through a rheostat serving as a speed regulator. The rheostat may, for example, be actuated by a speed governor driven by the motor. Alternatively, the power supply can be to the 4-pole armature winding while the main 4-pole field winding is energized by the 2-pole armature winding and the 2-pole field winding serves as the speed controlling winding.

According to a further feature, the speed controlling field winding is excited in a corrective sense in accordance with the motor speed. The control winding may be in two sections, one supplied at constant voltage and the other energized in accordance with speed, an amplification of the resultant flux being linked with the said armature winding; this resultant flux may induce an E. M. F. applied to a winding—which may for example be a field winding—which produces the amplified flux. The voltage dependent on motor speed may be obtained from an auxiliary generator driven by the motor; or, when the invention is applied to a motor generator set to operate at a substantially constant predetermined speed regardless of voltage fluctuations in the source of supply, the voltage dependent upon motor speed may, if desired, be obtained from the main generator itself.

According to a further feature, the speed controlling winding (on the motor itself or on an exciter therefor) is supplied, from a source of voltage proportional to motor speed, through a resistor of known kind whose resistance decreases rapidly with increase of voltage above a critical value. The resistance of this resistor is normally high compared with that of the field winding and the voltage across the resistor; and the greater part of the voltage applied to the circuit is just above the critical value when the motor is running at correct speed, whereby slight deviations of speed and changes of the speed-proportional voltage produce large changes in field current.

According to another feature of the invention, one section of the speed controlling field winding of the motor is excited from a constant voltage source, such as a battery, having an automatic voltage regulator associated therewith; and the other section is excited in accordance with the voltage output of a main or auxiliary generator driven by the motor, or by any other means responsive to speed. The field winding of the generator may also be supplied from the stabilized source. Where no source of stabilized voltage is available, the field winding of the generator and one section of the speed controlling winding of the motor may be supplied from a potentiometer circuit connected across the fluctuating source, the other section then being supplied by an auxiliary generator which is driven by the set and has its field excited from the potentiometer circuit. Thus any fluctuations of the main supply will be applied equally to both sections of the speed-controlling field winding and the balance will remain unaltered. In order to maintain the generator output voltage constant, an automatic voltage regulator responsive to generator output volts may be inserted in the generator field circuit.

In motor-generator sets as mentioned above, the generator may be either direct current or alternating current. In order to counteract the output voltage drop due to varying load, the generator may be provided with a compound winding carrying the whole or part of the direct-current motor current. In the case of an alternating-current generator, the supply to the control field may be through a rectifier.

The invention is illustrated by the accompanying drawings, of which:

Figs. 5 to 8 show various ways of connecting a machine according to Figs. 1 to 3 or 4; and Figs. 9 and 10 show the invention as applied to maintaining constant speed of a direct-current alternating-current motor generator set supplied from a source of fluctuating voltage.

Figure 1:
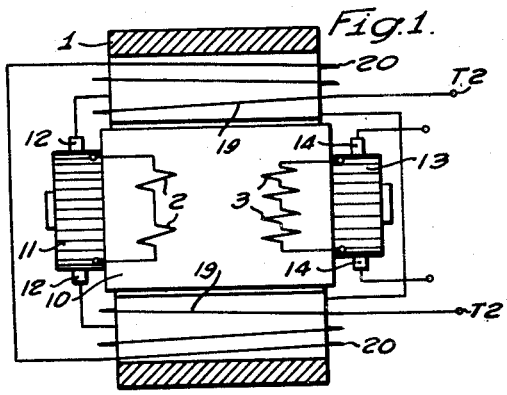
Figure 1 is a schematic and part-sectional view of one form of a motor according to the invention.
Figure 2:
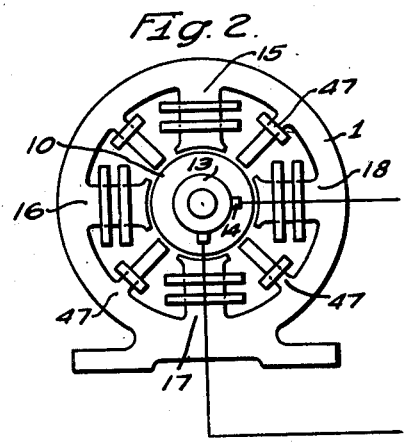
Figs. 2 and 3 are more realistic views from opposite axial sides of the same machine.
Figure 3:
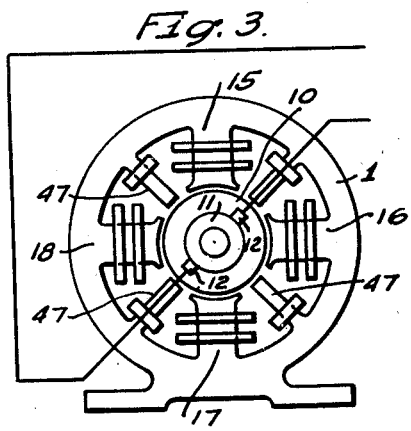

The machine represented by Figs. 1 to 3 has a field structure 1 and an armature 10. The armature has two systems of armature windings, shown schematically and denoted by 2 and 3 in Fig. 1. Armature windings 2 are wound for a 2-pole ($n$-pole) system, while armature windings 3 are wound for a 4-pole ($m$-pole) system. The armature has a commutator 11 for winding 2 with appertaining collector brushes 12 (Fig. 3). A second commutator 13 is connected with the winding 3 and has brushes 14 (Fig. 2). The two armature windings can both occupy the same slots, one being placed over the other. The commutators can conveniently be at opposite ends of the armature as shown.

The field structure 1 has four pole-pieces 15, 16, 17 and 18. Various field windings are indicated on these pole-pieces such as those denoted by 19 and 20 in Fig. 1. Alternative ways of arranging and connecting these windings are shown diagrammatically in the remaining figures.

A winding wound around poles 15 and 16 to make them both, for example, N poles and around poles 17 and 18 to make them both, for example, S poles will produce a 2-pole magnetic field which will have no appreciable effect on the armature winding connected to commutator 13; while a 4-pole winding around poles 15 and 18 making them N, S, N, S, will have no appreciable effect on the armature winding connected to commutator 11.

Figure 4:
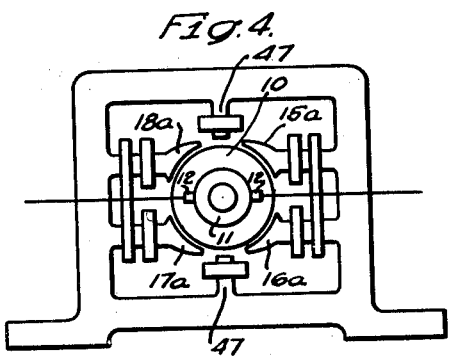
Fig. 4 is an end view of a modified embodiment.

The field system of the modification shown in Fig. 4 has one pole divided into parts 15a and 16a and another pole divided into parts 17a and 18a. The 4-pole field winding is wound around each of these parts separately. The 2-pole field winding has coils embracing parts 15a and 16a as a whole, to form one pole, and coils embracing parts 17a and 18a to form the other pole.

Figs. 2, 3 and 4 also show interpoles 47 with coils thereon, which may be connected in conventional manner in series with the respective armature windings for the purpose of satisfactory commutation.

Figure 5:
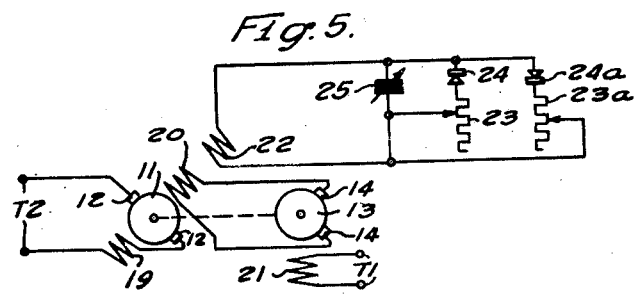

In Fig. 5, the 2-pole field winding is in two sections 19 and 20, the section 19 being connected in series with the brushes 12 across the terminals T2 and the section 20 across the brushes 14. The 4-pole field winding 21 serves as the speed control winding and is connected across the terminals T1.

With power supplied to the terminals T2 and so to brushes 12 through series winding 19, the machine will run as an ordinary series motor; and if a controlling voltage is applied to the terminals T1 of the 4-pole field winding 21, which thus acts as a control winding, the 4-pole field produced will not induce an electromotive force in the armature winding connected to commutator 11, nor will the application of this electromotive force to the 4-pole field winding 21 have any appreciable inductive effect on the 2-pole field windings 19 and 20. The electromotive force induced in the armature winding connected to commutator 13 energizes the 2-pole field winding 20 through commutator 13 and brushes 14, and this field winding induces an electromotive force in the armature winding connected to commutator 11 without having any action on either the 4-pole armature winding or the 2-pole field winding.

Thus by applying a small controlling power to the terminals T1, a highly amplified power proportional to the control power is applied to the armature winding connected to commutator 11 to vary the speed of the motor and the device will be comparatively quick in response. This proportionality exists as long as the flux paths are unsaturated.

The rate of response can be adjustably reduced by the damping field winding 22 shown in Fig. 5. Winding 22 is magnetically coupled with the 2-pole field winding 20 and has its circuit closed through an adjustable resistor 23 or, additionally or alternatively, through an adjustable condenser 25. If this damping action is desired only in one sense, a rectifying valve 24 is included in the circuit of resistance 23, or, if a separately adjustable damping action be required in the reverse sense, another adjustable resistor 23a and a rectifier 24a connected in the opposite sense to rectifier 24 are connected in shunt to resistance 23 and rectifier 24.

The amplification may be increased in various ways. Fig. 6, for example, shows a 4-pole compounding winding 26 in series with the circuit of brushes 14 and field winding 20.

If the speed of the machine is to be maintained at approximately a constant value, the controlling field winding 21 may be supplied, as shown in Fig. 7, from a voltage source 27 through a rheostat 28 actuated by a speed governor 29. Included in the control circuit may be a resistor 30 of the known kind whose resistance decreases rapidly with increase of voltage above a critical value. The resistance of resistor 30 is normally high compared with that of the field winding 21. Hence the voltage drop across resistor 30 represents the greater part of the voltage applied to the circuit, and this voltage drop is just above the critical voltage value when the motor is running at correct speed. As a result, slight deviations of speed and changes of the speed-proportional voltage produce large changes in field current.

In the embodiment of Fig. 8, the commutator 11 is provided not only with brushes 12 but also with an additional pair of brushes 31 displaced 90 electrical degrees from the brushes 12 and electrically connected together. In addition to the 2-pole control field winding 21 connected to the terminals T1, there is a 2-pole compensating winding 32 on the axis of and connected across the brushes 12 in series with the 4-pole main field winding 20. The compensating winding 32 minimizes the detrimental effect of armature reaction on the control flux of winding 21. The section 19 of the 4-pole field winding is in this case connected in shunt across the commutator 13. This embodiment has an additional stage of amplification making in all three stages of amplification in the machine. The rate of response may be adjusted by the 2-pole field winding 33 on the axis of brushes 31 and having its circuit extending through an adjustable rheostat 34.

According to Fig. 9, an alternating-current generator 35 has a separately excited field winding 36 supplied from a constant voltage source such as a battery 37. The motor is supplied through a series resistance 38 from the terminal T3 of a source of fluctuating voltage, the section 19 of the 2-pole field winding is connected in shunt across the terminal T3 of the fluctuating source. The 4-pole control winding has two sections 21 and 21a, excited differentially. Section 21a is excited from a constant voltage source 37 through a resistor 39. Section 21 is excited through a rectifier 40 in accordance with the alternating-current voltage of the generator 35. A resistor 41 having special properties as hereinbefore mentioned may be series connected with section 21.

The set is started by switching on the fluctuating and the constant voltage supplies. As the set accelerates, the output voltage of the alternating-current generator 35 builds up, and thus the rectified voltage applied to the winding 21 builds up until the field of winding 21 balances the opposing field of winding 21a. This occurs when a predetermined speed is attained, corresponding to the frequency required for the alternating-current voltage of generator 35. If the special resistor 41 is used, the current through the field winding 21 is small until this particular speed value is approached. Under the condition of balance, no excitation is applied to the winding 20 and the machine operates at the predetermined speed, the whole of the excitation being supplied by the winding 19.

If now the main supply voltage across terminal T3 fluctuates, the speed of the set and thus the rectified voltage applied to the winding 21 will decrease or increase. This alteration in voltage applied to, and of current flowing through, the field winding 21 upsets the balance between windings 21 and 21a. As a result, the armature winding connected to commutator 13 generates current and excites the field winding 20 connected across the brushes 14 to assist or oppose the shunt winding 19 and restore the speed of the set to substantially its predetermined value.

In the alternative scheme shown in Fig. 10 where no constant voltage supply is available, the field winding 21a and the alternating-current generator field winding 36 are excited from a potentiometer circuit 42 connected across the terminal T3 of the fluctuating voltage source. The field winding 21 is in this case energized by an unsaturated auxiliary generator 43 driven by the set. The field winding 44 of the auxiliary generator 43 is connected across the potentiometer circuit 42. Thus any fluctuations in the potentiometer circuit are applied equally to winding 21 and winding 21a, and the balance between the two will be unaffected provided there is no change in speed. Any change in speed causes a correction to occur due to the unbalance then imposed on the fields of windings 21 and 21a by the speed-controlled voltage variation of the auxiliary generator 43. As, however, the potentiometer circuit 42 also supplies the alternating-current generator field 36, any fluctuations in supply voltage will affect the generator output volts. To overcome this disadvantage, a voltage regulator 45 responsive to generator output volts may be included in the generator field circuit.

If desired, a compound winding carrying the whole or part of the direct-current motor current may be provided to counteract the alternating-current voltage drop with varying load. The generator may be either alternating current or direct current and in the latter case the rectifier 40 for supplying the control field winding will, of course, be unnecessary.

Instead of or additional to the resistance 38 (Fig. 9) in series with the 2-pole armature, a series winding may be provided to supplement the 2-pole shunt field winding. This series winding may be connected in series with the compound winding previously referred to.

It will, of course, be understood that the control windings and the main windings of the motor may be reversed, that is, the 2-pole windings may be the control windings and the 4-pole windings the main windings. Furthermore, it will be understood that the invention is not limited to a machine having 2- and 4-pole windings but is likewise applicable to machines with, for instance, 4 and 8, or 2 and 6 poles although I prefer selecting the pole numbers so that their ratio $(n/m)$ is an even number.

I claim as my invention:

1. A direct-current motor, comprising a multipolar field structure, an armature having a plurality of sets of brushes to establish a plurality of separate circuits through said armature, power input leads connected to one of said sets of brushes, a main field winding disposed on said structure to inductively cooperate with the armature circuit appertaining to said one set of brushes, a speed-control field winding disposed on said structure to inductively cooperate with a circuit appertaining to another one of said sets of brushes, variable circuit means for exciting said latter field winding, and means for exciting said main field winding under control by current generated between the brushes of said other set due to the excitation of said speed-control field winding.

2. A direct-current motor, comprising a multipolar field structure having an $m$-pole field winding and an $n$-pole field winding where $m/n$ is an even number, an armature common to said two field windings and having an $m$-pole winding and an $n$-pole winding provided with two respective commutators each having a set of brushes, power input leads connected to the one set of brushes appertaining to said $n$-pole armature winding for supplying load current to the motor, said $n$-pole field winding being connected across said other set of brushes, and circuit means connected to said $m$-pole field winding and including adjusting means for supplying variable excitation to said latter winding in order to thereby control the motor speed.

3. A direct-current motor, comprising a magnetic field system having a main field winding and a separately excited control field winding of negligible mutual inductance, an armature magnetically associated with said field system and common to said field windings, said armature having two windings each magnetically coupled with only one of said main and control field windings respectively and having two sets of commutator brushes in connection with said respective armature windings, circuit means connecting said main field winding to said one set of brushes appertaining to the armature winding coupled with said control field winding, power supply leads attached to said other set of brushes, and variable voltage supply means connected to said control field winding and controlled by the motor to excite said control field winding in dependence upon the motor speed.

4. A direct-current motor, comprising a magnetic field system having a main field winding divided into two sections and a separately excited control field winding disposed to have minimum mutual inductance with said main field winding, an armature magnetically associated with said field system and common to said field windings, said armature having two windings each magnetically coupled with only one of said main and control field windings respectively and having two sets of commutator brushes in connection with said respective armature windings, power supply means connected to one of said sections and to the one of said brush sets that appertains to the armature winding coupled with said main field winding, circuit means connecting said other section across said other set of brushes, and variable voltage means attached to said control field winding.

5. A motor according to claim 4, wherein one of said field windings and the corresponding armature winding are wound for a number of poles which is a multiple of the number of poles for which the other field winding and its corresponding armature winding are wound and wherein said armature has two separate commutators connected to said respective armature windings and associated with said respective sets of brushes.

6. A direct-current motor, comprising a magnetic field system having a main field winding and a separately excited control field winding, an armature having two commutators with respective sets of brushes and having two armature windings connected to said respective commutators and magnetically coupled with said respective field windings, said main field winding being connected across the one set of brushes of the one commutator that appertains to the armature winding coupled with said control field winding, power supply terminals connected to said other set of brushes, a damping field winding disposed on said field system and inductively coupled with one of said other field windings, and a circuit connected across said damping field winding and including variable impedance means.

7. A motor according to claim 6, comprising rectifying means connected in said circuit of said damping field winding for providing a directional damping effect.

8. A direct-current motor, comprising a magnetic field system having a main field winding and a separately excited control field winding, an armature having two commutators with respective sets of brushes and having two armature windings connected to said respective commutators and magnetically coupled with said respective field windings, said main field winding being connected across the one set of brushes of the one commutator that appertains to the armature winding coupled with said control field winding, power supply terminals connected to said other set of brushes, and a control circuit of variable voltage connected to said control field winding and including a series resistor of the type whose resistance decreases abruptly with increase of voltage above a critical value.

9. A direct-current motor, comprising a magnetic field system having a main field winding and a separately excited control field winding, an armature having two commutators with respective sets of brushes and having two armature windings connected to said respective commutators and magnetically coupled with said respective field windings, said main field winding being connected across the one set of brushes of the one commutator that appertains to the armature winding coupled with said control field winding, power supply terminals connected to said other set of brushes, a voltage generator driven by said armature and circuit means connecting said generator to said control field winding to excite it by voltage variable in accordance with the motor speed.

10. A direct-current motor, comprising a magnetic field system having a main field winding and a separately excited control field winding, an armature having two commutators with respective sets of brushes and having two armature windings connected to said respective commutators and magnetically coupled with said respective field windings, said main field winding being connected across the one set of brushes of the one commutator that appertains to the armature winding coupled with said control field winding, power supply terminals connected to said other set of brushes, said control field winding having two mutually differential sections, a direct-current circuit attached to one of said sections to normally provide substantially constant reference voltage therefor, and condition-responsive voltage means connected to said other section for applying variable voltage thereto.

11. A direct-current motor, comprising a magnetic field system having a main field winding and a separately excited control field winding, an armature having two commutators with respective sets of brushes and having two armature windings connected to said respective commutators and magnetically coupled with said respective field windings, said main field winding being connected across the one set of brushes of the one commutator that appertains to the armature winding coupled with said control field winding, power supply terminals connected to said other set of brushes, said control field winding having two mutually differential sections, a direct-current circuit attached to one of said sections to normally provide substantially constant reference voltage therefor, and variable-voltage supply means connected with the motor to provide a control voltage variable in accordance with motor speed, said supply means being connected to said other winding section.

12. A motor-generator set having a motor according to claim 9, wherein said control field winding has two mutually differential winding sections of which only one is connected to said generator, a potentiometric circuit connected across said power supply terminals and attached to said other winding sections to provide reference voltage therefor, said generator having a field winding also attached to said potentiometer circuit to be excited from said circuit.

13. A motor-generator set according to claim 12, comprising a voltage regulator disposed between said potentiometric circuit and said generator field winding to maintain the excitation of said generator field winding substantially constant.

14. A motor-generator set comprising a motor according to claim 9, wherein said generator is an alternator and said connecting circuit means include a rectifier for exciting said control field winding in accordance with the output voltage of said alternator.

15. A motor-generator set having an alternator and an auxiliary direct-current generator and a motor in driving connection with said alternator and generator, said motor comprising a main field winding and a control field winding and an armature, said armature having two commutators with respective sets of brushes and having two armature windings connected to said respective commutators and magnetically coupled with said respective field windings, said main field winding being connected across the one set of brushes of the one commutator that appertains to the armature winding coupled with said control field winding, power supply terminals connected to said other set of brushes, a potentiometric circuit connected across said terminals, said control field winding having two mutually differential sections of which one is connected to said potentiometric circuit, said auxiliary generator being connected to said other winding section to excite it by voltage proportional to motor speed, and said alternator and auxiliary generator having respective field windings connected to said potentiometric circuit.

ERIC ALTON BINNEY.

REFERENCES CITED

The following references are of record in the file of this patent:

UNITED STATES PATENTS

| Number | Name | Date |
| --- | --- | --- |
| 606,407 | Dobbie | June 28, 1898 |
| 1,468,157 | Holifield | Sept. 18, 1923 |
| 2,000,699 | Harding | May 7, 1935 |
| 2,018,108 | Allen | Oct. 22, 1935 |